(12) United States Patent
Landamia

(10) Patent No.: US 6,206,541 B1
(45) Date of Patent: *Mar. 27, 2001

(54) ROADSIDE EMERGENCY SECURITY FLASHLIGHT

(75) Inventor: Antonio Landamia, Hamilton, NJ (US)

(73) Assignees: Sony Corporation; Sony Electronic Inc., both of Park Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/525,128

(22) Filed: Mar. 14, 2000

Related U.S. Application Data

(62) Division of application No. 09/110,251, filed on Jul. 6, 1998.

(51) Int. Cl.[7] .................................................. F21L 17/00
(52) U.S. Cl. ......................... 362/184; 362/188; 362/190; 362/197
(58) Field of Search ................................... 362/184, 187, 362/188, 190, 197, 287

(56) References Cited

U.S. PATENT DOCUMENTS

| | | | |
|---|---|---|---|
| 4,739,457 | * | 4/1988 | Orr ........................ 362/202 |
| 4,782,432 | * | 11/1988 | Coffman .................. 362/157 |
| 5,073,823 | | 12/1991 | Yamada et al. ........... 358/209 |
| 5,189,520 | | 2/1993 | Okayasu et al. .......... 358/229 |
| 5,217,297 | * | 6/1993 | Yuen ....................... 362/184 |
| 5,697,695 | * | 12/1997 | Lin et al. ................. 362/184 |
| 5,806,961 | * | 9/1998 | Dalton et al. ............. 362/184 X |
| 5,871,272 | * | 2/1999 | Sharrah et al. ........... 362/184 |
| 5,909,952 | * | 6/1999 | Guthrie et al. ........... 362/184 |
| 6,056,414 | * | 5/2000 | Krieger .................... 362/190 X |

\* cited by examiner

*Primary Examiner*—Laura K. Tso
(74) *Attorney, Agent, or Firm*—Ronald P. Kananen; Rader, Fishman & Grauer

(57) ABSTRACT

A flashlight for use in emergency situations includes a front light, a rear light, a translucent body with lights underneath to serve as a light beacon, and pivotable legs for supporting the flashlight in a freestanding position. When the legs are pivoted away from the flashlight body, a normally open switch closes, automatically turning on the lights in the translucent body and operating the flashlight as an emergency light beacon. The material used in the translucent body and/or the lights in the body are preferably colored red to designate an emergency situation. Front and rear light sources on the flashlight, which can be adjustable, provide ambient and task lighting in the same manner as conventional flashlights. The flashlight may include a cigarette lighter adapter and rechargeable batteries as an alternative power source to conventional batteries.

17 Claims, 6 Drawing Sheets

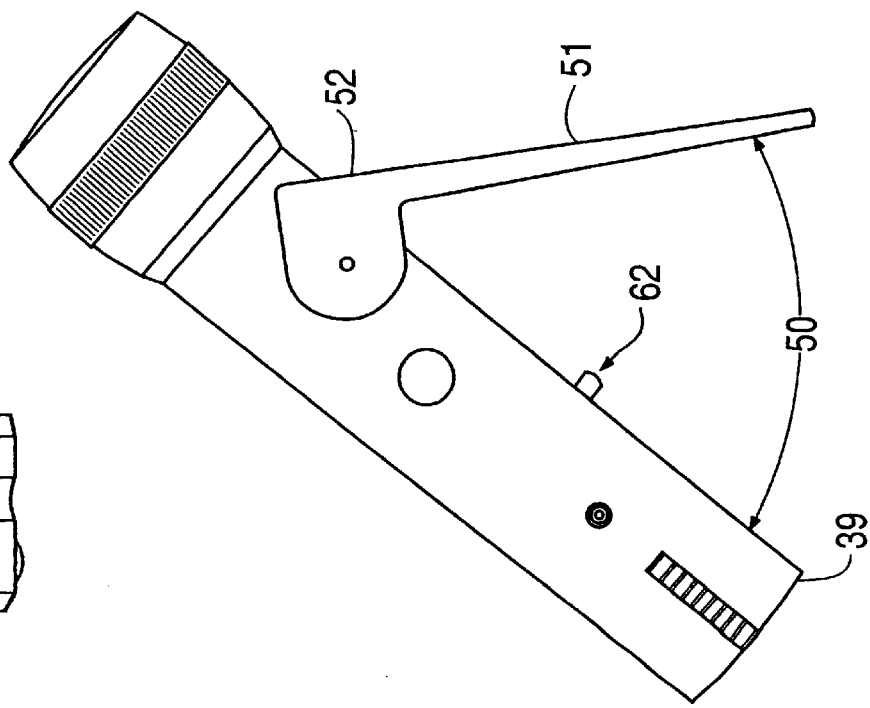
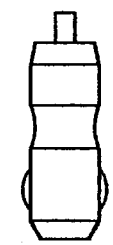
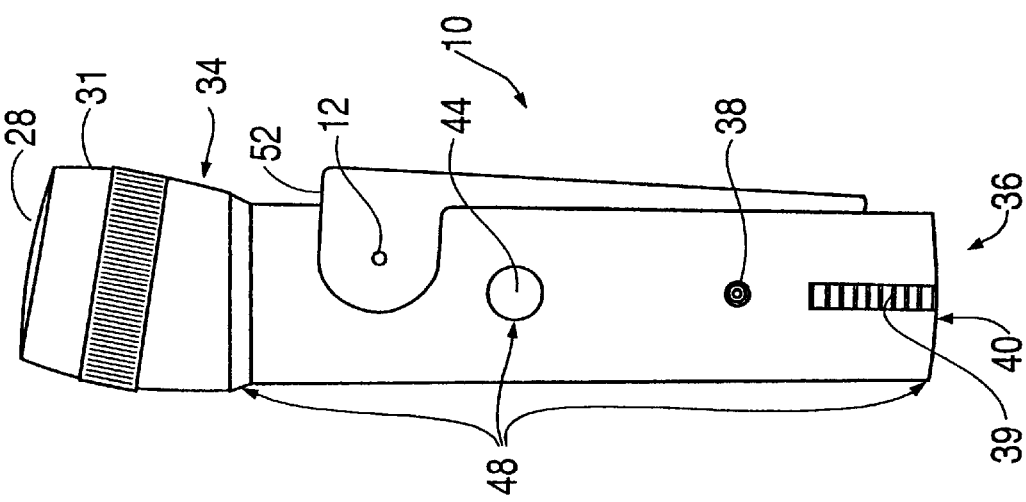

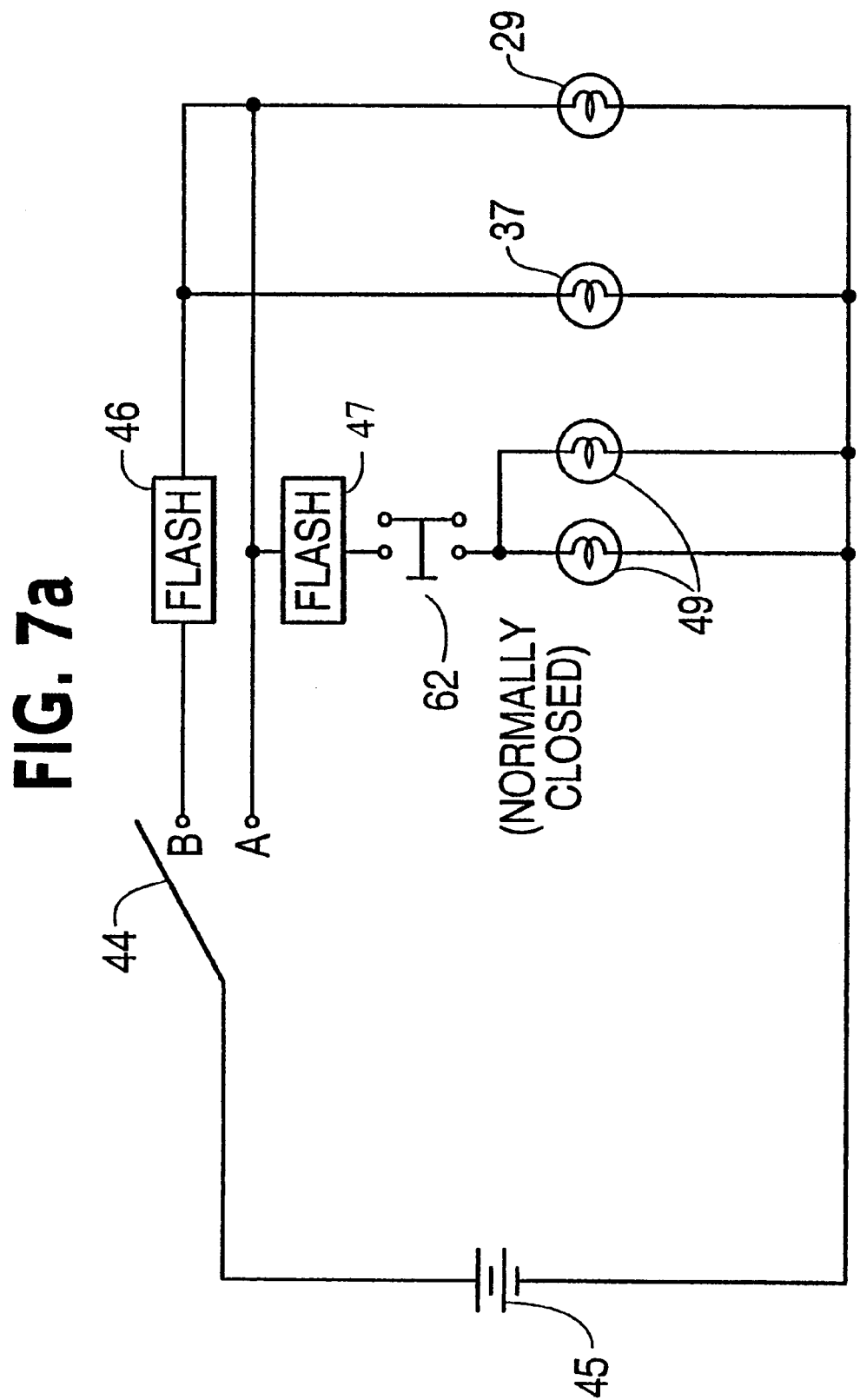

ROADSIDE EMERGENCY SECURITY FLASHLIGHT

This application is a divisional of application Ser. No. 09/110,251 filed Jul. 6, 1998.

TECHNICAL FIELD

The invention relates to flashlights for emergency roadside use, and more particularly to emergency flashlights having multiple light sources and a physical support means for supporting the flashlight in a free-standing semi-upright or upright position.

BACKGROUND OF THE INVENTION

This invention relates to a flashlight suited for emergency roadside use. More particularly, this invention relates to a flashlight with a flashing beacon and a tripod stand for use in emergency situations. Still more particularly, this invention relates to a flashlight adapted for use during emergency roadside situations, wherein the light includes a front light source having a variable focus from a flexible and adjustable head piece, a translucent body that can serve as a flashing beacon, a tripod for self-supporting the flashlight, a rear light source and a controller for selecting whether a particular light in the flashlight shines in a steady state or a flashing state.

BACKGROUND ART

Flashlights and lanterns having various features are known in the art for providing compact, easily accessible lighting, especially in emergency situations. Perhaps the best known conventional lighting device is a flashlight with a rotatable member for adjusting the focus of a light beam from a reflected bulb. The flashlight is usually powered by one or a plurality of batteries, such as D-size batteries. The bulb in this type of flashlight is usually contained in a housing with a removable head for replacing the bulb and the batteries. A switch located on the flashlight body turns the light on or off. These conventional flashlights are convenient and portable, but they do not have any structure that can support the flashlight in a freestanding upright or semi-upright position so that a user can direct the light in a particular direction without having to hold the flashlight.

Various modifications of the basic flashlight are also known in the art, such as using high intensity bulbs with compatible battery sources, a battery connection for an automobile lighter, and flexible yet semi-rigid tubing to secure the light in a desired location. The latter is known in the art under the trademark "SNAKELIGHT".

A conventional lantern, best known for railroad use, is constructed as a freestanding light structure. Lantern batteries are more substantial in size and the lanterns are larger than conventional flashlights. Some lanterns are able to stand on their lighted end while resting on a cylindrical frame. In addition, sometimes the handle is sufficiently large and stable to act as a base for positioning the lantern in an upright orientation. Many lanterns, however, tend to be too bulky and cumbersome for motorists to carry in their cars as an emergency lighting device.

Thus, flashlights and lanterns have shortcomings for potential use in emergency roadside situations. Ideally, a device should operate as a conventional flashlight when needed, and should be convertible to an emergency roadside flashing light with a stand for maintaining the flashlight in a selected freestanding position to direct the light at, for example, an area of a car needing repair. In addition, it would be desirable for the flashlight handle to be translucent and have its own associated light source to act as an emergency light beacon. Still further, it would be advantageous to construct a multi-featured flashlight so that the same flashlight can be used in both regular and emergency lighting situations.

These and other features addressed by the invention will become apparent from a review of the following discussion.

SUMMARY OF THE INVENTION

Accordingly, the present invention is directed to a flashlight that can easily convert from a conventional flashlight to an emergency roadside flashlight. The flashlight according to the invention includes a generally cylindrical body and a bulb, similar to a conventional flashlight. The body houses one or more batteries for supplying energy to the bulb. Preferably, the flashlight body is made from a translucent plastic material that is colored with a universally recognized emergency-indicating color, such as red, so that the flashlight body glows red when a light source in the body is illuminated. Alternatively, the translucent plastic material can be illuminated by installing red light sources, such as light emitting diodes (LED's), in the flashlight body beneath the plastic.

A retractable tripod or flashlight stand pivotably connected to the flashlight body can support the flashlight in a freestanding, semi-upright or upright position to direct the light beam onto a desired area while leaving the user's hands free to, for example, conduct emergency car repairs. When the stand is not in use, the legs of the stand fit axially along the outer circumference of the flashlight housing, creating a compact overall structure. When positioned to support the flashlight, the stand's legs can act, if desired, as a switch for initiating flashing of the flashlight body as a light beacon. In other words, the stand, pivot mechanism, and the light in the flashlight body can be coupled together so that the light beacon automatically begins lighting and/or flashing as soon as the legs are pivoted into their extended position.

The flashlight is also preferably alternatively powered by an automotive cigarette lighter adapter with a voltage regulator to use the car battery as an auxiliary or main power source. Other features in the preferred embodiment include a battery level indicator, and a spare bulb located in a compartment at the rear end of the flashlight body. Further, the rear end of the flashlight could also include a rear light source to generate an additional light beam.

These and other features of the invention will become apparent from a review of the written description of the invention which follows, taken with the accompanying drawings.

BRIEF DESCRIPTION OF THE DRAWINGS

FIG. 2 is a side elevational view of the emergency flashlight according to the invention showing the flashlight stand in its retracted position;

FIG. 3 is a side elevational view of the emergency flashlight according to the invention with its stand extended to support the flashlight in a freestanding, semi-upright orientation;

FIG. 4 is a side schematic view of an automotive cigarette lighter adapter and regulator for providing power to the emergency flashlight from an automobile battery;

FIGS. 7a and 7b are simplified circuit diagrams for the flashlight according to the first and second embodiments of the invention.

DETAILED DESCRIPTION OF THE PREFERRED EMBODIMENTS

Figure 1:
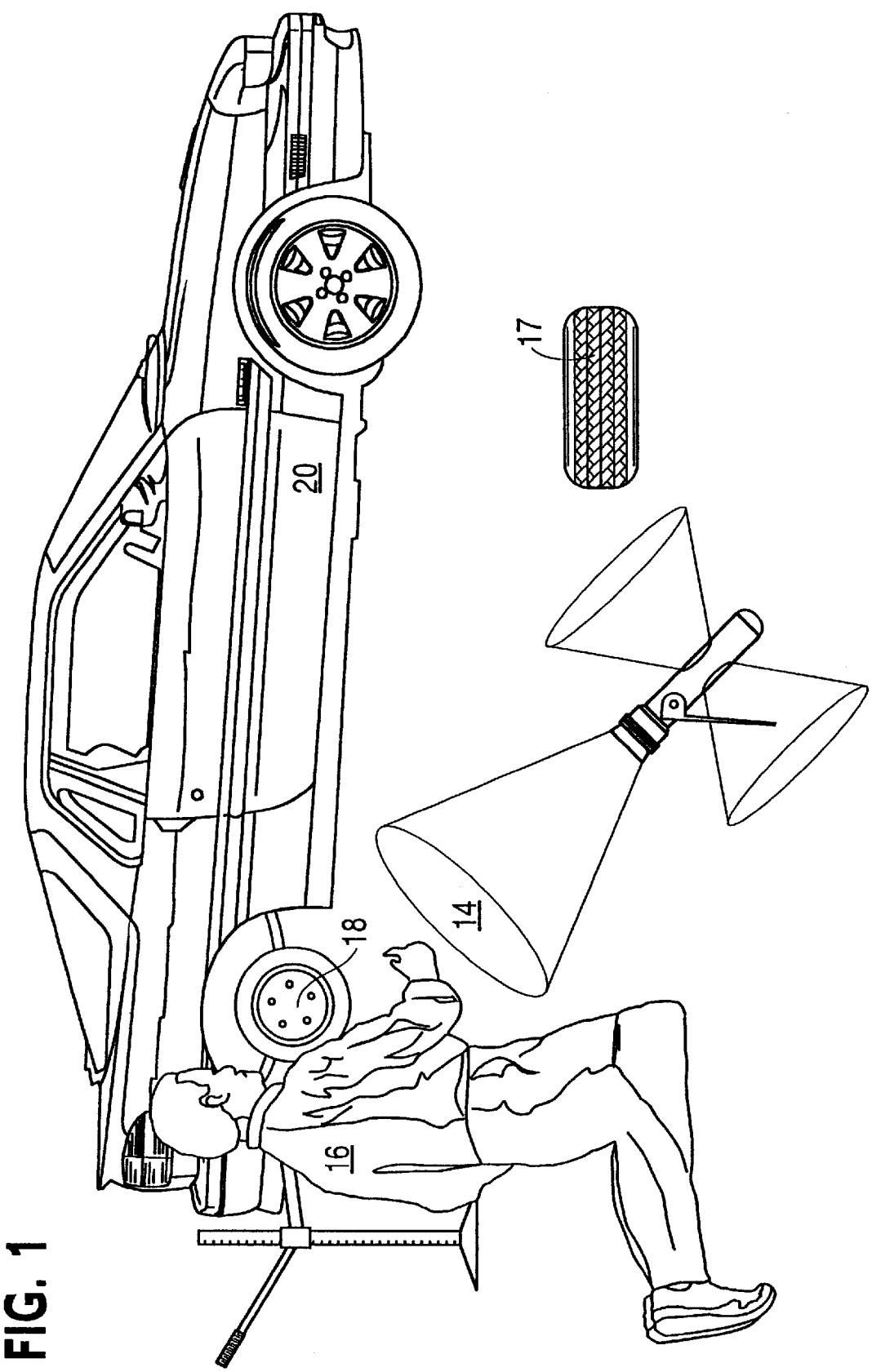
FIG. 1 is a plan view of the emergency flashlight according to the invention illustrating the invention's use in a roadside emergency.

As shown in FIG. 1, the roadside emergency light 10 according to the invention has an extendible and retractable flashlight stand 12. In FIG. 1, the stand 12 is shown in its extended position and is used to support the flashlight 10 in a freestanding, semi-upright position. As shown, the flashlight 10 directs a fixed, forwardly extending light beam onto a location selected by the user. In FIG. 1, a user 16 is changing a rear tire on the right rear wheel 18 of an automobile 20 having its back end hoisted by a conventional jack. The flashlight 10 according to the invention also provides a flashing light beacon 22 that is emitted from the body or casing 26 of the flashlight 10. Thus, as shown in FIG. 1, the flashlight 10 according to the invention provides illumination like a conventional flashlight, but also includes a stand 12 for supporting the flashlight 10 in a freestanding semi-upright or upright position to direct the light beam in a hands-free manner. Additionally, the flashlight 10 of the invention emits a flashing light beacon 22 from the body of the flashlight 10 to serve as an emergency alert device for warning oncoming traffic or assistance vehicles.

FIG. 2 is a side elevational view of the flashlight 10 according to the invention with a front light source 28 having a bulb 29 with a reflector 30 and a rotatable member 31 for adjusting the illumination area and intensity of the light beam. The rotatable member 31 allows the user to change the focus of the light beam between a broad light wash over a larger area to a brighter, more focused light over a smaller area, depending on how the light is to be used. The flashlight 10 may also be constructed so that the front light source 28 swivels via a swivel head 34 to maximize the number of directions in which the light beam can be aimed.

The rear end 36 of the flashlight 10 according to the invention can include a conventional battery level detector 39 for indicating the charge level of the batteries housed in the body 26 of the flashlight 10 and a compartment 40 for housing a spare bulb. Alternatively or in addition to the battery level detector 39 and the compartment 40, the rear end 36 of the flashlight 10 can include a light source 37 to generate a flashing light beam.

Figure 7B:
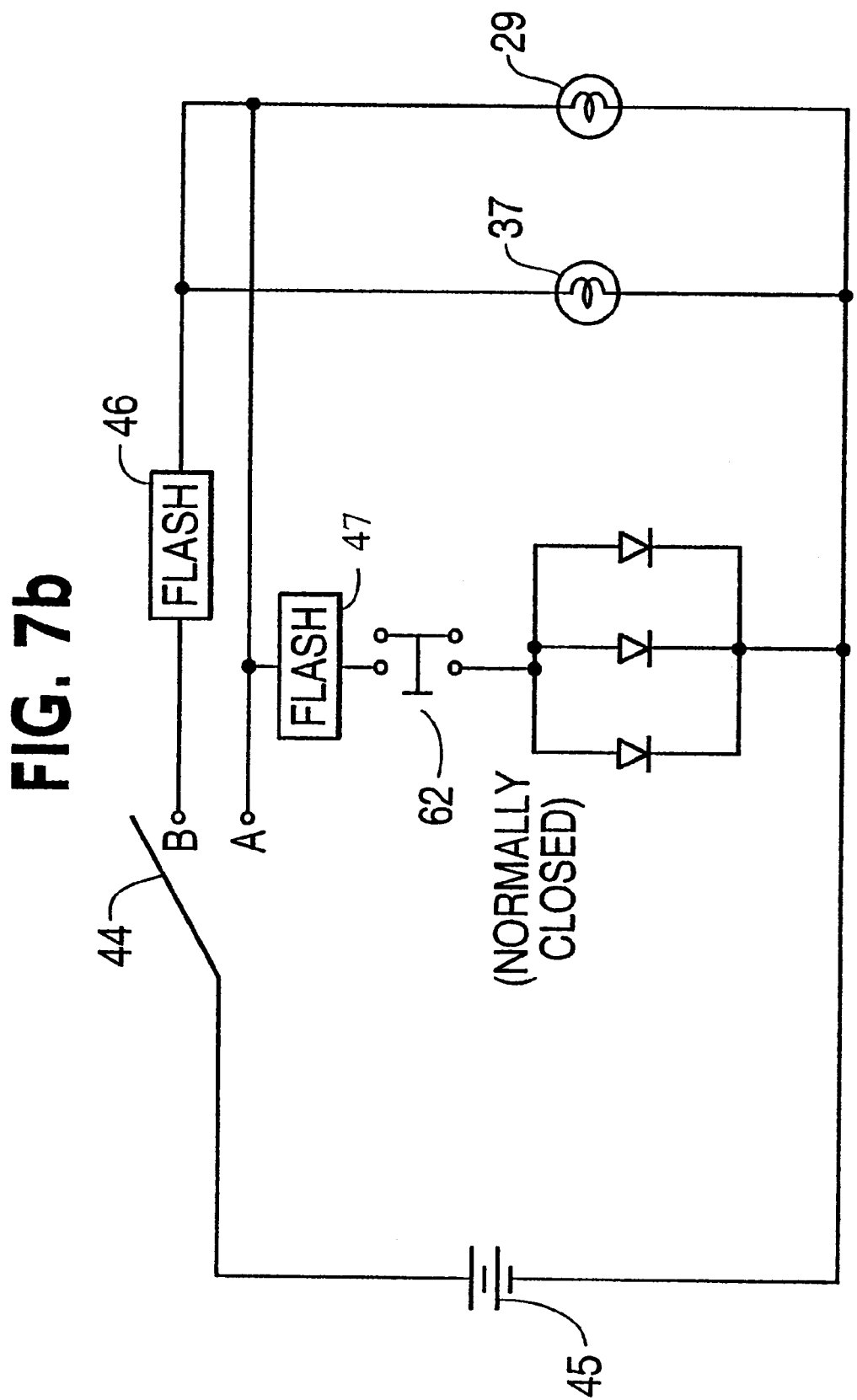

Although FIG. 1 illustrates the light emitting from the front light source as a steady light beam, a switch 44 can change the light beam of the front light source 29 from a steady beam to a flashing beam. Similarly, the rear light source 37, if provided, preferably acts as a flashing light, but may alternatively act to provide a steady light beam. As shown in FIGS. 1, 7a and 7b, for example, the same switch 44 can be used to turn on the flashlight and to change the light beams from the front and rear light sources 29, 37 from steady light beams to flashing light beams. When the user depresses the switch 44 the first time, the switch 44 connects with node A, where the circuit connects the power source 45 with the lights 29, 37. When the user depresses the switch a second time, the switch connects with node B, where the circuit includes any known flash controller 46 for causing the front and rear lights 29, 37 to flash intermittently. Those of skill in the art would understand that other switch configurations and independent control of the front and rear lights 29, 37 can also be implemented without departing from the spirit of the invention.

A plurality of waterproof seals 48 are respectively provided at the forward end of the casing adjacent the swivel head 34, at the switch 44, and at the rear end opening to the light bulb compartment 40 or rear light source 37. The seals 48 prevent water or dirt from entering the flashlight 10, increasing the flashlight's durability for use in harsh outdoor conditions.

FIG. 4 illustrates a conventional cigarette lighter adapter with an internal regulator for providing power to the flashlight 10 from the electrical system of the automobile. The flashlight 10 can be constructed so that it can be connected with a cigarette light adapter such that the flashlight 10 is powered by the adapter and not by its batteries. Another alternative is to couple the cigarette lighter adapter with the flashlight 10 and conventional rechargeable batteries so that the batteries can be recharged when the flashlight is plugged into the adapter but not being operated.

Figure 5:
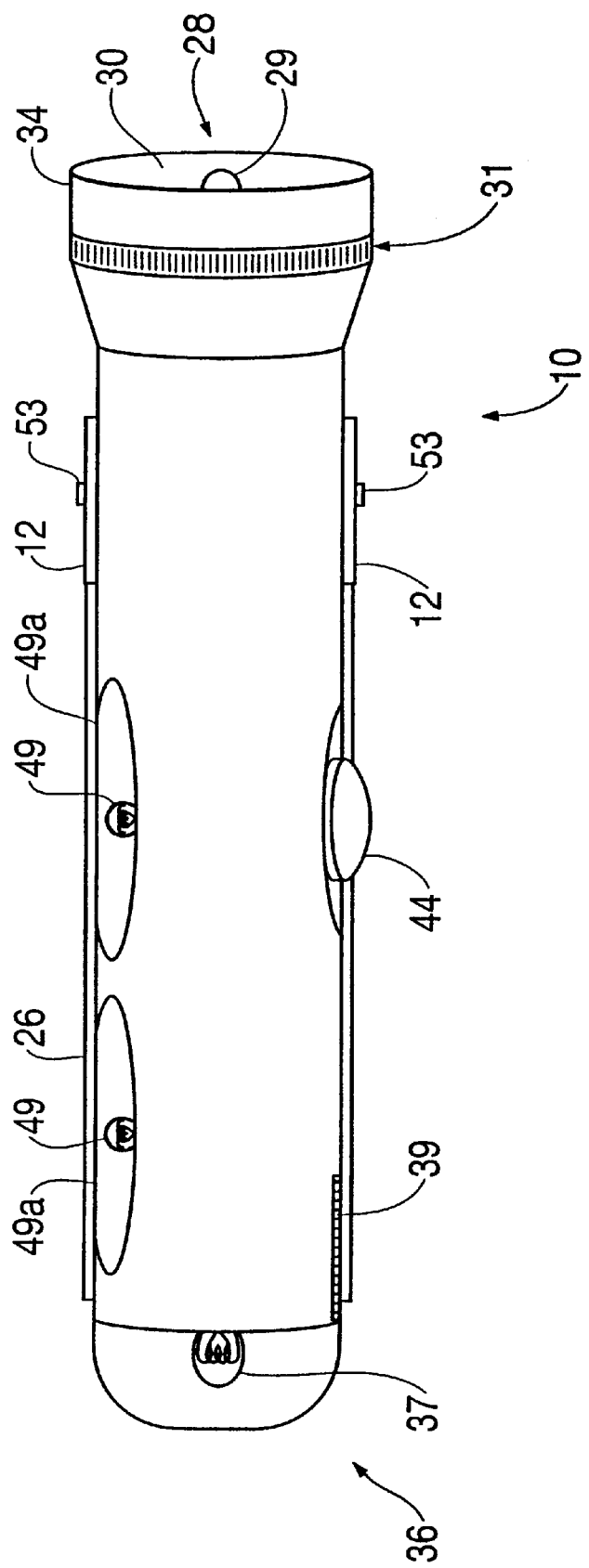
FIG. 5 is a side view of one embodiment of the flashlight according to the invention, showing second and third bulbs for illuminating the translucent shell of the flashlight body.

FIG. 5 shows one possible structure for illuminating the plastic body 26 of the flashlight. Inside the plastic body 26, a plurality of side light sources 49 are connected with the power source 45. The side light sources 49 are disposed underneath the translucent plastic of the body 26. Because the plastic is translucent, the light from the side light sources 49 is easily transmitted through the body 26 to emit a flare of light as seen in FIG. 1. By providing a low voltage flasher units 46 and 47, such as a capacitor, the lights 49 can cyclically turn on or off. In the embodiment shown in FIG. 5, parabolic reflectors 49a are provided to direct the light outward, away from the flashlight body 26. However, the invention can be constructed with any number of side light sources, with or without reflectors, as long as the flashlight body 26 is sufficiently illuminated to alert traffic.

As mentioned in the discussion of FIG. 1, the battery casing 26 is preferably made from a translucent plastic either in its entirety or in sections for transmitting light. Because the light beacon 22 generated by the side light sources 49 should preferably be colored red to indicate more clearly the presence of an emergency situation, either the light or the translucent plastic, or both should be colored red. The translucent plastic protects the light or lights 49 underneath from damage, and it also helps refract and scatter the light so that the illumination covers a greater overall area, increasing its visibility from a distance.

Figure 6:
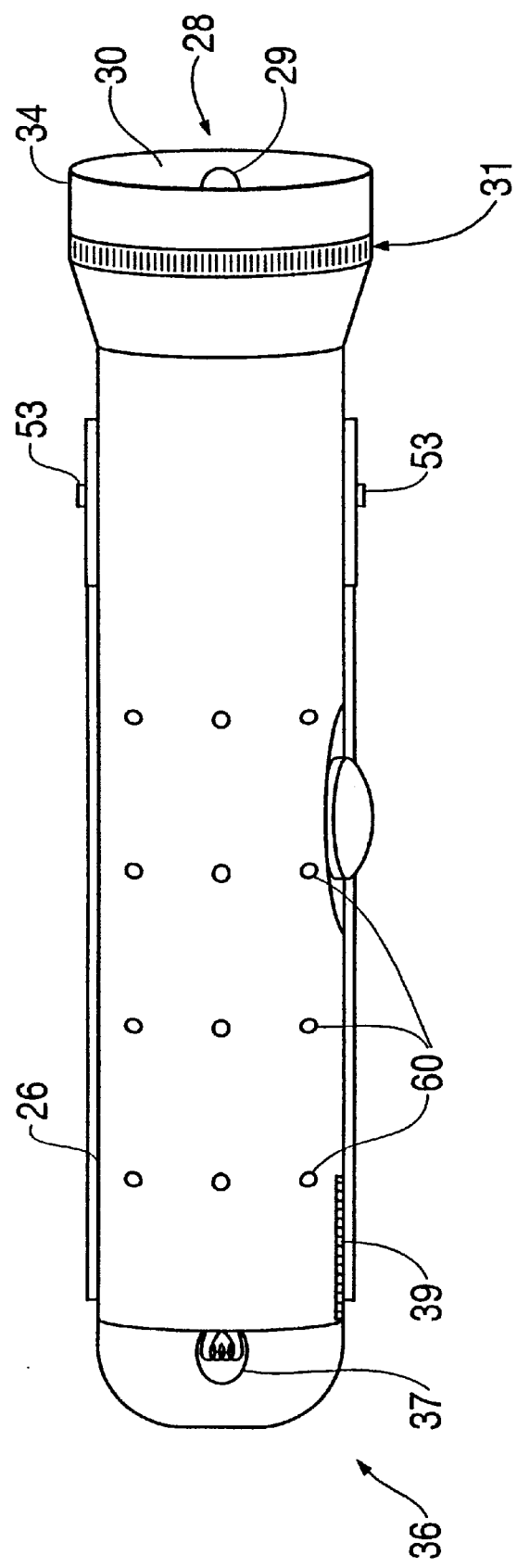
FIG. 6 shows another alternative lighting arrangement for illuminating the translucent shell of the flashlight body by one or more rings of LED's underneath the translucent shell.

FIG. 6 illustrates yet another embodiment where a plurality of LED's 60 are disposed underneath the plastic layer for lighting the flashlight body 26. For maximum visibility, superbright LED's could be used in conjunction with a textured translucent plastic layer to diffuse or refract the bright light from the LED's 60 over a broader area. A suitable flasher unit 62 may also be connected to the LED's 60 to generate a more dynamic light display, which tends to attract more attention and therefore increases the likelihood that the light will be noticed by oncoming motorists.

A retractable flashlight stand 50 provides freestanding support for the flashlight 10 when the user wishes to direct the light beam to a particular area without holding the flashlight 10, such as when changing a tire. The stand 50 includes at least a pair of extended and preferably extendible legs 51 secured to a pair of opposing connection members 52 which are pivotable about a pivot 53 on the flashlight body.

If desired, the pivoting action of the legs 51 can initiate operation of the flashlight. FIGS. 3, 7a and 7b shows one possible structure where the legs 51 engage with a normally closed switch 62 on the flashlight body 26 when they are in the retracted position, biasing the switch in an open position. When the legs 51 are pivoted into their extended position, the biasing action of the auto-on switch 62 moves the switch 62 from the open position into a closed position, completing the connection between the power supply 45 and any or all of the light sources, depending on the specific internal circuit configuration. In this example, the flashlight body 26 illuminated when the legs 51 are pivoted, but those of skill in the art would recognize that other light sources can be controlled by the auto-on switch without departing from the scope of the invention.

As shown in FIGS. 7a and 7b, the switches for at least the side light sources 49 and the front/rear light sources 29, 37 are preferably independent from each other so that the user can select which lights should be turned on at any given time. For example, in an emergency situation where the flashlight 10 is being used as a light beacon, the user may wish to pivot the legs 51 to illuminate the flashlight handle but leave the front and rear light sources 29, 37 off to conserve energy. Alternatively, the front and rear light sources 29, 37 can also be independent from each other, rather than controlled by the same switch.

It should be understood that various alternatives to the embodiments of the invention described herein may be employed in practicing the invention. It is intended that the following claims define the scope of the invention and that the methods and apparatus within the scope of these claims and their equivalents be covered thereby.

What is claimed is:

1. A portable flashlight, comprising:
   a body portion made from a translucent material for transmitting light therethrough;
   a front light source on a front end of said body portion;
   a side light source on a side of said body portion, said side light source arranged to transmit a side light beam through the translucent material of said body portion;
   a power supply to generate power for operating said front light source and said side light source;
   a support device that can be placed in one of a retracted position and an extended position, said support device being capable of supporting said portable flashlight in an orientation having a vertical component; and
   a swiveling head on said front end of said body portion, said swiveling head incorporating said front light source such that a user can selectively direct a light beam from said front light source by moving said swiveling head.

2. The portable flashlight of claim 1, further comprising at least one flashing unit, wherein said flashing unit is connected to said front light source to selectively generate a steady light beam or a flashing light beam with said front light source.

3. The portable flashlight of claim 1, further comprising at least one flashing unit, wherein said flashing unit is connected to said side light source to selectively generate a steady light beam or a flashing light beam with said side light source.

4. The portable flashlight of claim 1, further comprising a switch for controlling either or both of said front and side light sources in response to movement of said support device between said retracted position and said extended position.

5. The portable flashlight of claim 4, wherein said switch is a normally closed switch that is biased open when said support device is in said retracted position such that said switch automatically closes and connects said side light source with said power supply when said support device is moved to said extended position.

6. The portable flashlight of claim 1, further comprising a rear light source on a rear end of said body portion.

7. The portable flashlight of claim 6, further comprising a switch for controlling said rear light source.

8. The portable flashlight of claim 7, wherein said rear light source and said front light source are both controlled by said switch.

9. The portable flashlight of claim 6, further comprising a flashing unit connected to said rear light source such that said rear light source flashes when said flashing unit is activated.

10. The portable flashlight of claim 1, wherein said side light source comprises a plurality of light sources arranged along an interior of said body portion for emitting light through said translucent material, wherein each of said light sources of said plurality of lights is partially surrounded by a separate reflector for directing light through said translucent material.

11. The portable flashlight of claim 1, wherein said side light source comprises a plurality of LEDs arranged along a circumference of an interior of said body portion for emitting light through said translucent material.

12. The portable flashlight of claim 1, wherein said power supply includes an automobile cigarette lighter adapter.

13. The portable flashlight of claim 1, wherein said power supply comprises one or more batteries, said flashlight further comprising a battery level indicator on said body portion, said battery level indicator indicating a charged level of said one or more batteries over a continuum of possible charge levels.

14. The portable flashlight of claim 1, wherein said support device comprises:
   a pair of opposing connection members that are pivotable about a pivot on said body portion;
   a pair of extendible legs, each leg secured to one of said pair of connection members, wherein each leg is pivotable between said retracted position, where the legs are arranged flush against said body portion of the flashlight, and said extended position, where the legs are pivoted away from said body portion.

15. The portable flashlight of claim 1, further comprising a compartment in said body portion containing a spare light bulb.

16. The portable flashlight as claimed in claim 1, further comprising a rotatable member on said body portion for selectively giving said front light a first narrow focus or a second broader focus.

17. A portable flashlight, comprising:
   a body portion made from a translucent material for transmitting light therethrough;
   a front light on a front end of said body portion;
   a side light on a side of said body portion, said side light arranged to transmit a side light beam through the translucent material of said body portion;
   a power supply to generate power for operating said front light and said side light;
   a support device that can be placed in one of a retracted position and an extended position, said support device being capable of supporting said portable flashlight in at least an orientation having a vertical component; and
   a rotatable member on said body portion for selectively giving said front light a first narrow focus or a second broader focus.

* * * * *